Dec. 16, 1958    J. J. MENDELSOHN    2,864,744
PENICILLIN IN SOLID DOSAGE UNIT FORM
Filed Dec. 5, 1955
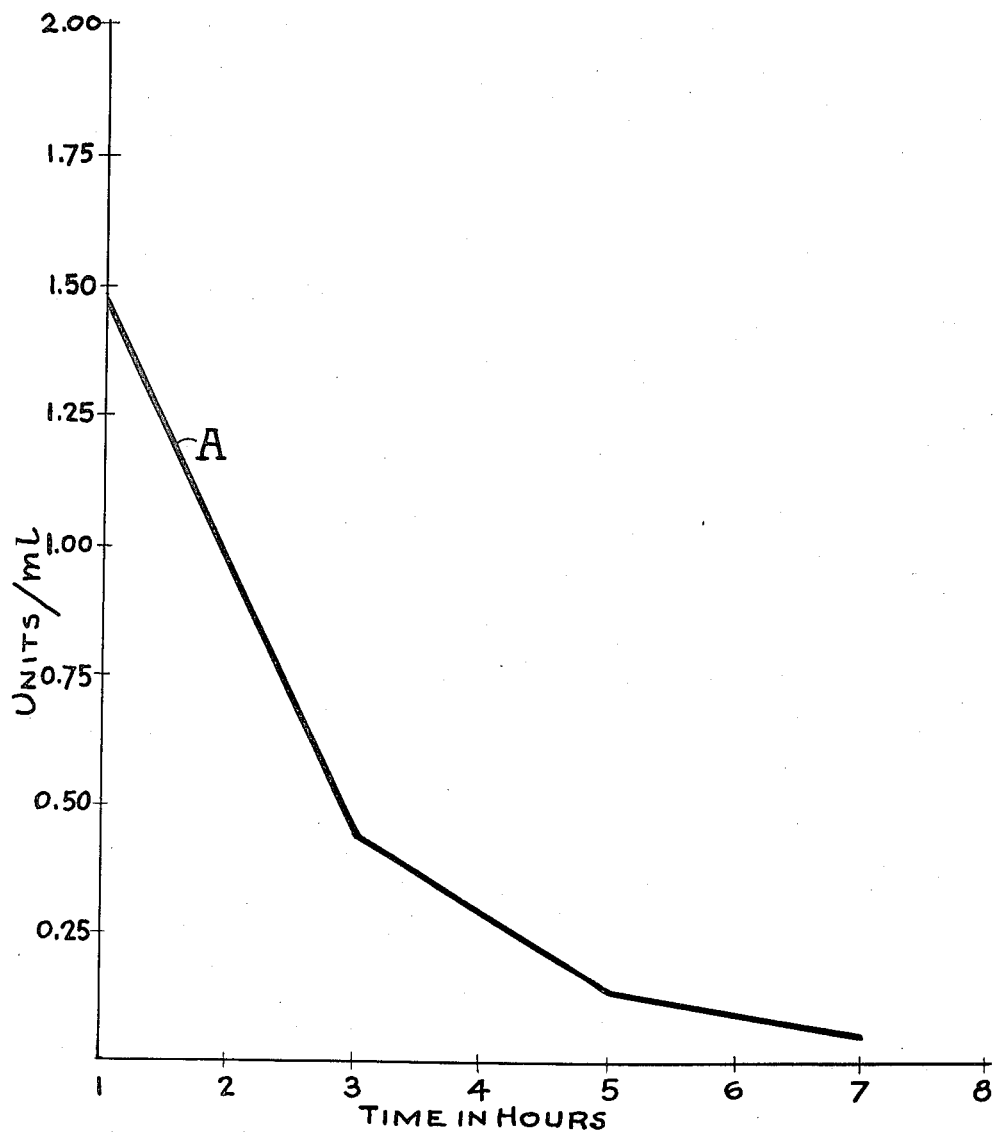
Inventor
JACK J. MENDELSOHN
By Louis H. Beer
Attorney

United States Patent Office 2,864,744
Patented Dec. 16, 1958

2,864,744

PENICILLIN IN SOLID DOSAGE UNIT FORM

Jack J. Mendelsohn, Montreal, Quebec, Canada, assignor to American Home Products Corporation, New York, N. Y., a corporation of Delaware Application December 5, 1955, Serial No. 551,171

Claims priority, application Canada September 2, 1955

6 Claims. (Cl. 167—65)

The present invention relates to a penicillin dosage unit in solid compressed form. More particularly it relates to a penicillin tablet or the like which is suitable for oral use, substantially resistant to the action of gastric juice, readily soluble in intestinal juice, and thus capable of providing very high initial blood levels of penicillin, as well as therapeutic blood levels up to seven hours.

It is known to those skilled in the art that various water-soluble salts of penicillin are not very effective when taken orally as the penicillin is inactivated by the gastric juices.

It is known that certain buffers will inactivate a certain amount of the gastric juices but in order to effectively protect against the gastric juices so as to permit passage of the penicillin in an active form into the intestinal tract, it is known that large amounts of buffer are required. The amount required would be such as to provide a dosage unit of enormous size.

Some of the disadvantages of water-soluble penicillin salts have been somewhat recently obviated by the preparation of highly insoluble salts of penicillin, for example, dibenzyl ethylenediamine penicillin salt. These highly water-insoluble penicillin salts have been found to somewhat resist inactivation by the gastric juices and can thus pass into the intestinal tract wherein they are gradually absorbed over a considerable time period, providing prolonged penicillin blood level. Nevertheless, it has frequently been found desirable to provide a high initial blood level of penicillin, such as is readily obtained under suitable conditions with the water-soluble salts of penicillin.

It has now been found possible to develop an oral penicillin preparation which is substantially resistant to destructive action of the gastric juices, yet will quickly release its water-soluble activity in the intestinal tract and thus provide a high initial penicillin blood level, and in addition, supply a prolonged therapeutic penicillin blood level, for example, up to at least seven hours.

In accordance with the present invention, there is now provided a therapeutic dosage unit in solid compressed form, which contains a water-soluble penicillin salt, and which overcomes the disadvantages of prior art preparations of water-soluble penicillin salts in oral use.

The therapeutic dosage unit containing a water-soluble penicillin salt is dispensed in solid compressed form and has been found to be substantially impervious to the action of gastric juices while still being capable of readily releasing the penicillin activity in the presence of intestinal juices to provide a high initial blood level of penicillin.

In accordance with the present invention, a water-soluble penicillin salt is rendered substantially impervious to the action of the gastric juices by incorporating therewith a water-insoluble protein, which is soluble in a saturated aqueous solution of the penicillin salt, and an acid-insoluble and alkali-soluble medicinal shellac. It has been found that when these ingredients are homogeneously mixed with excipients well known in the art, and compressed in the form of a tablet, the distribution of the essential ingredients throughout the tablet is such that the shellac and protein prevent any substantial disintegration of the tablet by the gastric juices, thereby causing most of the penicillin activity to reach the intestinal tract where the tablet is rapidly disintegrated by the intestinal juices. It should be noted that the protective protein and shellac are not present at the surface of the tablet only, but are homogeneously dispersed through the tablet.

The penicillin salt used is of the water-soluble type, for example, sodium, potassium or ammonium penicillin G. The protein used in the dosage unit is one which is water-insoluble and acid-insoluble, but soluble in a saturated aqueous solution of the penicillin salt selected. As examples of such a suitable protein there may be mentioned edible casein and zein. The purpose of the protein is to substantially prevent leaching of the penicillin salt in the presence of gastric juice.

The penicillin salt and casein, which have been intimately mixed with other excipients, are dispersed in a colloidal solution of medicinal shellac, for example, white shellac. Other equivalent shellacs may also be used. The shellac is preferably dispersed in a solution of isopropyl alcohol.

In order to neutralize any gastric juice that might penetrate at the surface of the dosage unit, a mixture of buffers is added to the composition, such that the pH of the aqueous solution of the dissolved product will be between 5.5 and 7.5. These necessary buffers also provide for rapid disintegration of the product in the intestinal juice.

In general, it might be stated that the excipients are so selected that the ones used will not inactivate the penicillin. As examples of excipients there might be mentioned lactose, sorbitol, magnesium stearate and many others which are well known to those skilled in the art.

The dosage unit of the present invention is prepared in the following manner. A dispersion of the shellac in isopropyl alcohol is first made up and to this is added a homogeneous blend of the penicillin salt, casein, buffer and other excipients. After mixing all of the ingredients to a homogeneous mix, the mix is granulated and compressed in a tablet-forming machine in a manner which is well known in the art.

In the dosage unit, the water-soluble penicillin comprises presumably from 25% to 50% by weight, the casein, from 15% to 25% by weight or about 50% of the weight of the penicillin, the white shellac, from 8% to 15% by weight with sufficient buffering agent present to yield a pH between 5.5 and 7.5.

Upon oral administration of the dosage unit of the present invention, it has been found that in the first hour after ingestion, there is an exceptionally high initial blood dosage level of penicillin and therapeutic level is maintained for about at least seven hours. It is thus surprising that the product formulation has proven satisfactory in providing both initial high levels and prolonged therapeutic levels of penicillin in the blood stream.

The present invention will be more fully understood by referring to the following example.

EXAMPLE 4,500 grams of a white shellac was first dispersed in the necessary volume of isopropyl alcohol. Then a blend of 19,368 grams of crystalline potassium penicillin G (1580 u./mgm.), 9600 grams of edible casein, 3000 grams of sodium citrate USP, 1200 grams of calcium carbonate, 8400 grams of lactose, 12,000 grams of sorbitol, 2.4 grams of D. C. orange No. 3 (90%) was prepared. The blend was mixed with the shellac solution and the mixture granulated and compressed into tablets, in a manner known in the art, weighing about 12 grains. Each tablet contained about 500,000 units of penicillin.

It was found that only slight disintegration occurred after thirty minutes in the presence of gastric juice at 37°, and that only the outside shell of the tablet had swollen and approximately three-quarters of the tablet remained as a hard core. The tablet was then transferred to intestinal juices, where it disintegrated in approximately thirty minutes. After disintegration of the tablet, it was found that at least 75% of the penicillin potency was present in the intestinal juices.

The tablet of the present invention, containing 500,000 units of potassium-penicillin, was administered orally to a group of human patients one-half hour before breakfast. Blood samples were taken one, three, five and seven hours after administration of the tablet. Penicillin assays were done by the standard *Sarcina lutea* plate method. Results of the penicillin blood levels of the individual patients are shown in the following table.

Table I.—*Penicillin blood levels in u./ml.*

| Patient No. | 1 hr. | 3 hrs. | 5 hrs. | 7 hrs. |
|---|---|---|---|---|
| 1 | 1.6 | 0.29 | 0.175 | 0.032 |
| 2 | 2.5 | 0.50 | 0.162 | 0.072 |
| 3 | 1.3 | 0.43 | 0.14 | 0.072 |
| 4 | 1.3 | 0.105 | 0.072 | 0.027 |
| 5 | 1.75 | 1.05 | 0.43 | 0.140 |
| 6 | 3.7 | 1.05 | 0.22 | 0.068 |
| 7 | 2.5 | 1.22 | 0.29 | 0.062 |
| 8 | 1.05 | 0.50 | 0.15 | 0.037 |
| 9 | 1.22 | 0.12 | 0.01 | 0.01 |
| 10 | 0.82 | 0.22 | 0 | 0 |
| 11 | 0.9 | 0.165 | 0.072 | 0.01 |
| 12 | 1.12 | 0.14 | 0.028 | 0.01 |
| 13 | 1.51 | 0.46 | 0.14 | 0.078 |
| 14 | 0.54 | 0.13 | 0.024 | 0.01 |
| 15 | 0.54 | 0.172 | 0.172 | 0.042 |
| Average | 1.49 | 0.437 | 0.139 | 0.054 |

The averages of the blood levels as given in Table I are shown in the drawing which graphically illustrates the results obtained. Curve A shows the blood levels achieved over a period of 7 hours when using tablets prepared in accordance with the example.

I claim:

1. A therapeutic dosage unit in solid compressed form comprising as a uniform mixture a therapeutic amount of water-soluble penicillin salt, a water-insoluble and acid-insoluble protein which is soluble in a saturated aqueous solution of the penicillin salt, an acid-insoluble, alkali-soluble medicinal shellac, a buffering agent, and excipients, said dosage unit being substantially resistant to the action of the gastric juice while readily disintegrating and releasing its penicillin activity in the presence of intestinal juice.

2. A therapeutic dosage unit in solid compressed form comprising as a uniform mixture from about 25–50% by weight of a water-soluble penicillin salt, from about 15–25% by weight of a water-insoluble and acid-insoluble protein which is soluble in a saturated aqueous solution of the penicillin salt, 8–15% of alkali-soluble medicinal shellac and a buffering agent in an amount to yield a pH in the range of 5.5 to 7.5 and excipients, said dosage unit being substantially resistant to the action of the gastric juice while readily disintegrating and releasing the penicillin activity in the presence of intestinal juice.

3. A therapeutic dosage unit in solid compressed form comprising as a uniform mixture about 33% of a water-soluble penicillin salt, about 20% of a water-insoluble and acid-insoluble protein which is soluble in a saturated aqueous solution of the penicillin salt, about 10% of alkali-soluble medicinal shellac, and about 7% of buffer, the remainder being excipients, said dosage unit being substantially resistant to the action of the gastric juice while readily disintegrating and releasing the penicillin activity in the presence of intestinal juice.

4. A therapeutic dosage unit as defined in claim 3 wherein the water-insoluble protein is edible casein.

5. A therapeutic dosage unit as defined in claim 3 wherein the water-insoluble protein is zein.

6. A therapeutic dosage unit in solid compressed form comprising as a uniform mixture about 33% by weight of an alkali metal salt of penicillin, about 20% by weight of casein, about 7% by weight of buffers and about 10% by weight of white shellac, the remainder of the unit being excipients, the penicillin, casein and white shellac being homogeneously dispersed throughout the dosage unit.

References Cited in the file of this patent

UNITED STATES PATENTS

| 2,438,106 | Alburn | Mar. 23, 1948 |
| 2,449,039 | Libby | Sept. 7, 1948 |
| 2,566,200 | Hickey | Aug. 28, 1951 |

FOREIGN PATENTS

| 629,281 | Great Britain | Sept. 15, 1949 |

OTHER REFERENCES

Thompson: J. A. P. A., vol. 34, No. 5 (Sci. Ed.), May 1945, pp. 135–138.